United States Patent [19]
Bello et al.

[11] Patent Number: 5,700,980
[45] Date of Patent: Dec. 23, 1997

[54] AERIAL CABLE SPACER

[75] Inventors: Salvatore H. Bello, W. Boylston, Mass.; John W. Howanski, Windham, N.H.

[73] Assignee: Conductron Corporation, Milford, N.H.

[21] Appl. No.: 443,712

[22] Filed: May 18, 1995

[51] Int. Cl.$^6$ .................................................. H02G 7/12
[52] U.S. Cl. .............................................. 174/146; 174/42
[58] Field of Search ........................... 174/40 R, 40 TD, 174/42, 43, 45 R, 146, 148, 149 R

[56] References Cited

U.S. PATENT DOCUMENTS

| | | | |
|---|---|---|---|
| 3,021,382 | 2/1962 | Horrocks et al. | 174/146 X |
| 3,300,576 | 1/1967 | Hendrix et al. | 174/146 |
| 3,784,723 | 1/1974 | Cantamessa | 174/42 |
| 4,020,277 | 4/1977 | LaChance, Sr. et al. | 174/146 |
| 4,082,917 | 4/1978 | Hendrix | 174/146 |
| 4,188,502 | 2/1980 | Gagné | 174/42 |

*Primary Examiner*—Hyung S. Sough
*Attorney, Agent, or Firm*—David Teschner

[57] ABSTRACT

An aerial cable spacer and support fabricated from separate arm members and braces which are selectively joined to form an open frame device which can be hung from a messenger wire. The inclusion of a plurality of fins at acute angles to the arm members and braces increases the leakage distance between cable phases and with ground while facilitating the washing of the fin surfaces and that between the fins while preventing the build up of water on those surfaces. Different lengths of arm members and braces can be fabricated with the same tooling permitting components to be sized according to the voltage ratings of the cable system.

16 Claims, 4 Drawing Sheets

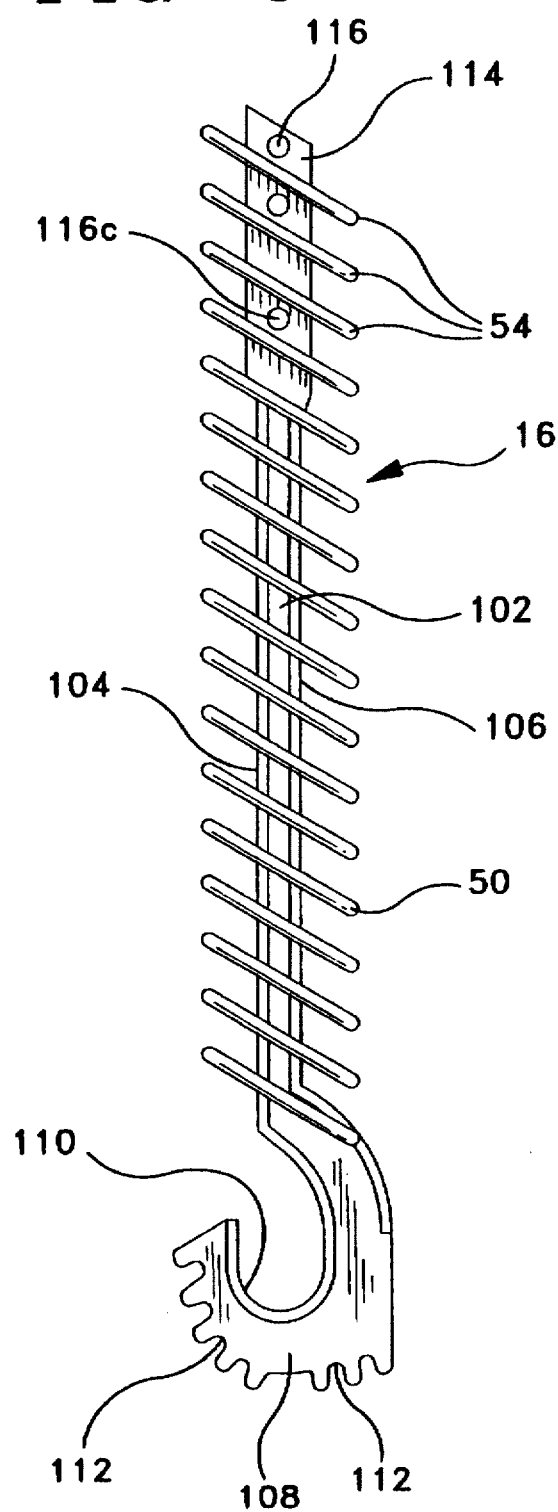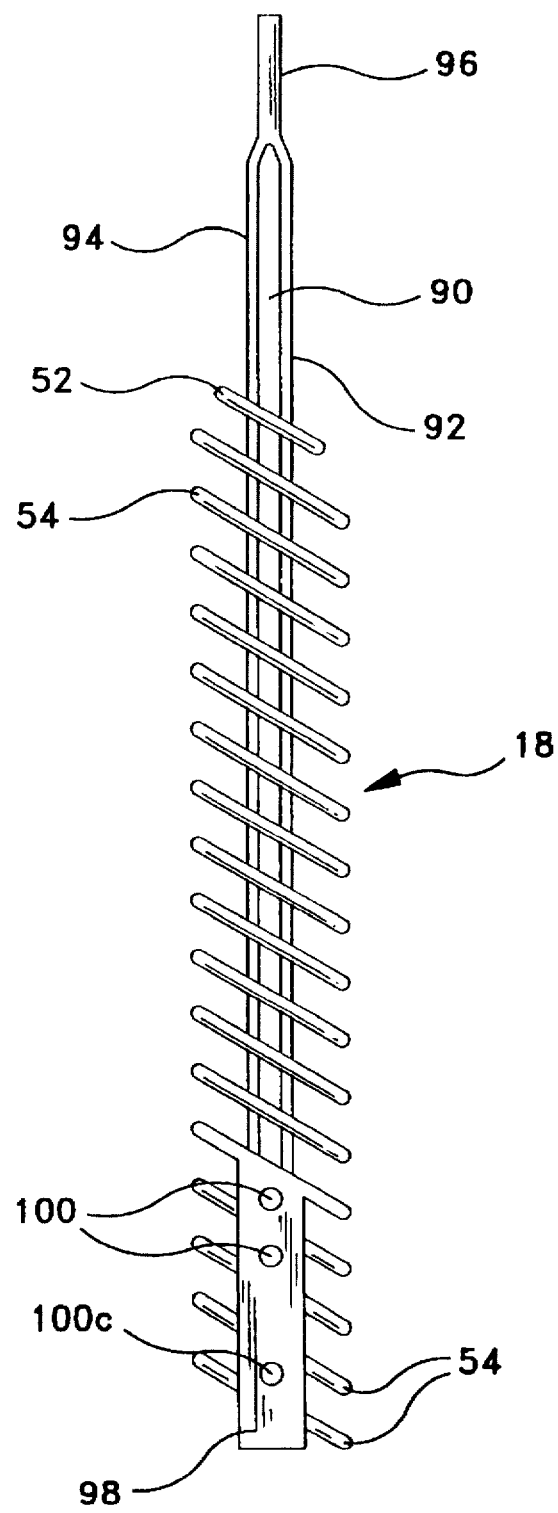

AERIAL CABLE SPACER

BACKGROUND OF THE INVENTION

1. Field of the Invention

The invention is directed to the field of overhead distribution cable systems and more particularly to a spacer and support for multi-conductor aerial cable distribution systems.

2. Description of the Prior Art

U.S. Pat. No. 3,300,576, owned by the assignee of the instant invention, issued Jan. 24, 1967, now expired, taught an aerial cable spacer which was fabricated as a single unit and provided spacing of the cable phase conductors from each other and from ground. The device was suitable for use up to 40 KV. To provide the necessary spacing between the cable phase conductors and between such conductors and the messenger-ground, using the concepts of this patent would require that the spacer size be so increased that it would be difficult to mount it on existing poles and would greatly add to the weight of the system to be supported.

U.S. Pat. Nos. 4,020,277 issued Apr. 26, 1977, now expired and 4,082,917 issued Apr. 4, 1978, and also now expired, both owned by the assignee of the instant invention, show how a spacer and support for an aerial distribution cable system can be fabricated using an open center diamond shaped device to support the three phase conductors and which permits the device to be hung from a messenger cable. Since available pole space is at a premium, it would not be prudent to mold a single size of spacer at the size required for the highest voltage system and since each spacer is fabricated as a single, integral unit, a number of molds are required.

U.S. Pat. Nos. 3,784,723 issued Jan. 8, 1974, now expired, and 4,188,502, issued Feb. 12, 1980, show complex cable spacers which also provide for damping the vibrations that can occur in overhead cable. The arms can be positioned with respect to a central body to damp out the cable vibrations but are not adjusted to change the separation of the cables based upon the system voltage.

SUMMARY OF THE INVENTION

The present invention overcomes the difficulties noted above with respect to prior art devices by providing an aerial cable spacer and support which can be fabricated from individual arm members and braces to give a strong, lightweight device which can be sized in accordance with the voltage rating of the cable system with which it is used. Also by making the tooling, which is employed to fabricate the components of the cable spacer, of multiple, individual segments, which can be added or removed, the same basic tooling can be used for all sizes of spacers. The inclusion of angled fins on the arm members and braces greatly increases the leakage distances between the phase conductors and the phase conductors and ground which at the same time facilitates the washing of the fin surface and adjacent surfaces of the arm members and braces while preventing the build-up of moisture on these same surfaces. It is an object of this invention to provide a novel aerial cable spacer.

It is an object of this invention to provide a novel aerial cable spacer which is fabricated from individual components.

It is yet another object of this invention to provide a novel aerial cable spacer which is fabricated from individual components sized according to the voltage of the cable system with which the spacer is used.

It is still another object of this invention to provide angled fins on each component of this novel spacer to increase the leakage distances between the phase cables and ground while permitting the washing of the surfaces of the fins and adjacent arm members and braces.

Other objects and features of the invention will be pointed out in the following description and claims and illustrated in the accompanying drawings, which disclose, by way of example, the principles of the invention, and the best mode presently contemplated for carrying them out.

BRIEF DESCRIPTION OF THE DRAWING

In the drawings in which similar elements are given similar reference characters:

FIG. 5 is a front elevational view of another arm member of the aerial cable spacer end support of FIG. 1

FIG. 6 is a front elevational view of a first brace of the aerial cable spacer and support of FIG. 1.

DESCRIPTION OF THE PREFERRED EMBODIMENT

As described in the above mentioned U.S. Pat. No. 3,300,576 and by this mention made a part hereof, the spacer impedance $Z_s$ must be kept high, as compared to $Z_c$, the impedance of the cable, so that the voltage gradient will be largest on the spacer of $Z_s$ so that the spacer will take the damage rather than the conductor if corona is to start. Arcing and erosion or pitting of the conductor surface will be prevented. The surface impedance characteristic is maintained at a sufficiently high value such that the voltage drop caused by leakage currents thereacross is a substantial part of the voltage impressed between the messenger and conductors and whereby the conductor insulation is protected against harmful voltage stresses, leakage currents and corona discharges. All weather high spacer impedance is achieved under the invention by obtaining a high capacitive impedance of the spacer insulation through use of material of low dielectric constant, and by obtaining and maintaining a high electrical surface resistance of the spacer. The surface resistance is affected by the condition of the surface, which is dependant on the shape, the material of the surface and the leakage distance. Accordingly, under this invention, there is employed for the spacer a material and design having a high impedance when wet as well as when dry, which induces a desired surface condition even under adverse weather conditions and which affords the necessary leakage distance.

Figure 3:
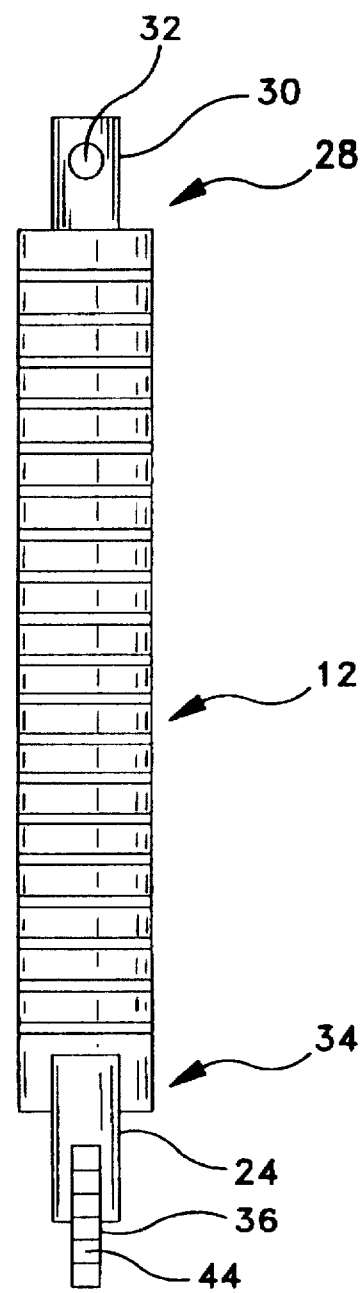
FIG. 3 a side elevational view of the arm member of FIG. 2.

Turning now to FIGS. 1 to 7 there is shown an aerial cable spacer and support 10 made of a first arm 12, a second arm 14, a third arm 16, a first brace 18 and a second brace 20. First arm 12 is made of a central, relatively flat central portion 22 flanked by transverse flanges 24 and 26 which extend equally to both sides of central portion 22 giving arm 12 an I-beam cross-section. At a first end 28, of arm 12 the flanges 24 and 26 merge into a flat tab 30 which has an aperture 32 therethrough as best seen in FIG. 3. At the second end 34 there is formed a terminal hook 36 which has a round bottomed conductor saddle or seat 38. The flange 24 extends about the conductor saddle or seat 38 to provide additional strength. The flange 26 extends about only a portion of the back of the terminal hook 36 and terminates in a tab 40 having an aperture 42 for assembly to brace 20 as will be described below. The remainder of the back of hook 36 contains a number of slots 44 which can be used to receive cable ties (not shown) which are used to anchor cables (not shown) in the saddle or seat 38.

The resistance to the flow of the changing current with its attendant faulting or burning of the conductor is a function both of the effective length of and the resistivity of the spacer surface. The effective spacer length is the length of the spacer surface in the leakage path between conductors. The resistivity of the spacer in that path, under all weather outdoor operating conditions, is dependant upon the accumulation of dust and other contaminants on and also the wetting of the spacer surface.

To increase the effective length of the path between the conductors and between the conductors and the grounded messenger cable a series of fins 50 are placed about each of the arms 12, 14 and 16 and the braces 18 and 20. The fins 50 are molded completely about the periphery of each of the arms and braces and form on their outer edges a complete rectangle. The edges of the fins 50 are rounded and the fins 50 are set at an acute angle to the longitudinal axis of the arm or brace upon which they are molded. Fins 52 are smaller than the remaining fins 50 because they will be closest to the juncture of arms 12 and 14 to avoid contact with the fins 50 of such arms. Fins 54 may be formed as partial fins completed when arm 16 and brace 18 are assembled.

The leakage path along the arm 12 from a conductor in saddle 38 of hook 36 will then be along the surface of arm 12 and over each of the fins 50 to the grounded messenger cable in the top hook to be described below. The length of this path is in the order of 150 to 300% of the straight through air path from the conductor in hook 36 to the messenger cable. The relatively smooth surface of the arm 12, its flanges 22 and 24 and the surfaces of the fins 50 provide little basis for dirt, moisture and other environmental material to accumulate on these surfaces and are quickly removed by wind or rain and whose droplets also cannot accumulate.

Figure 1:
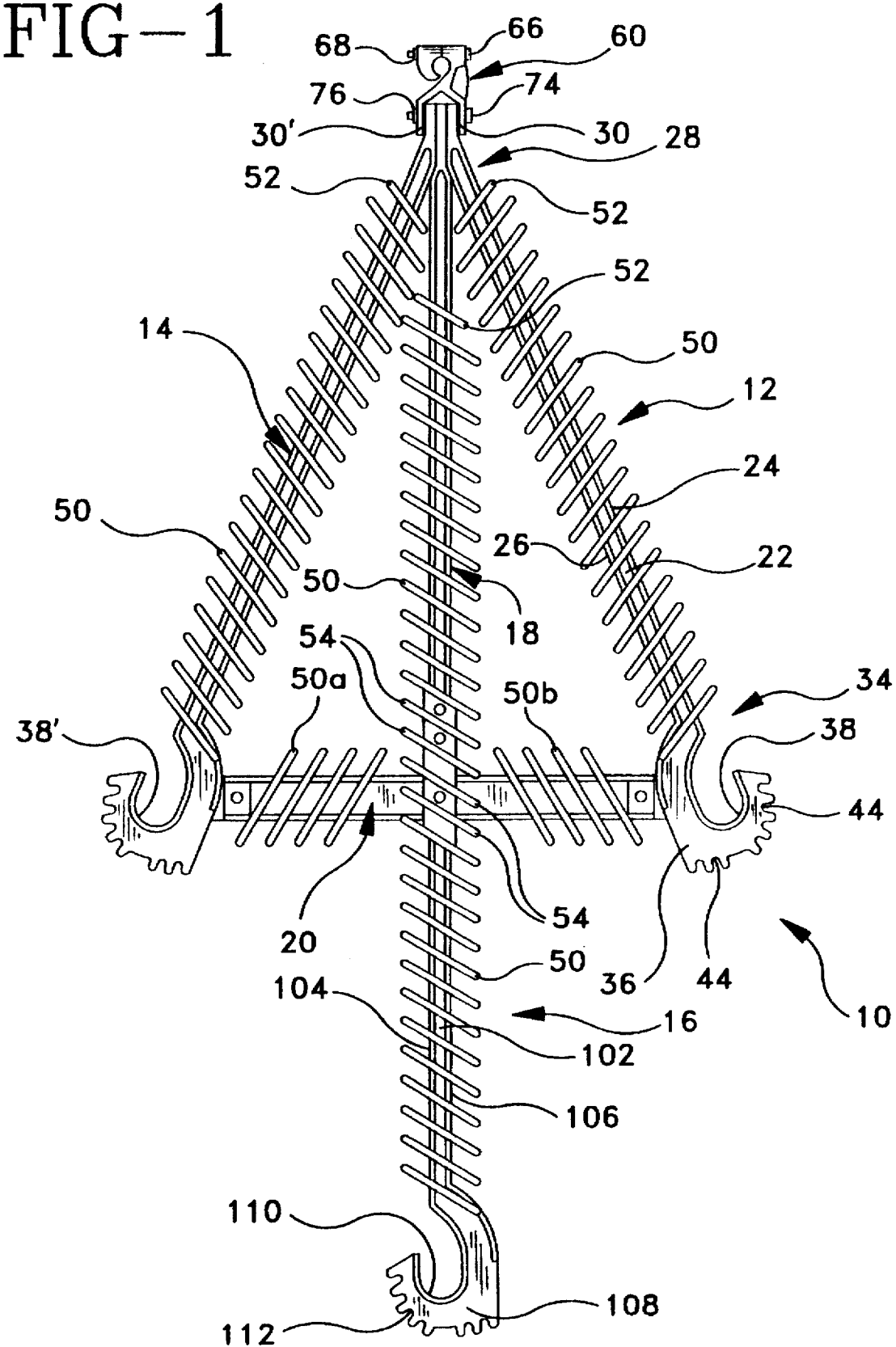
FIG. 1 is a front elevational view of an aerial cable spacer and support constructed in accordance with the concepts of the invention.
Figure 2:
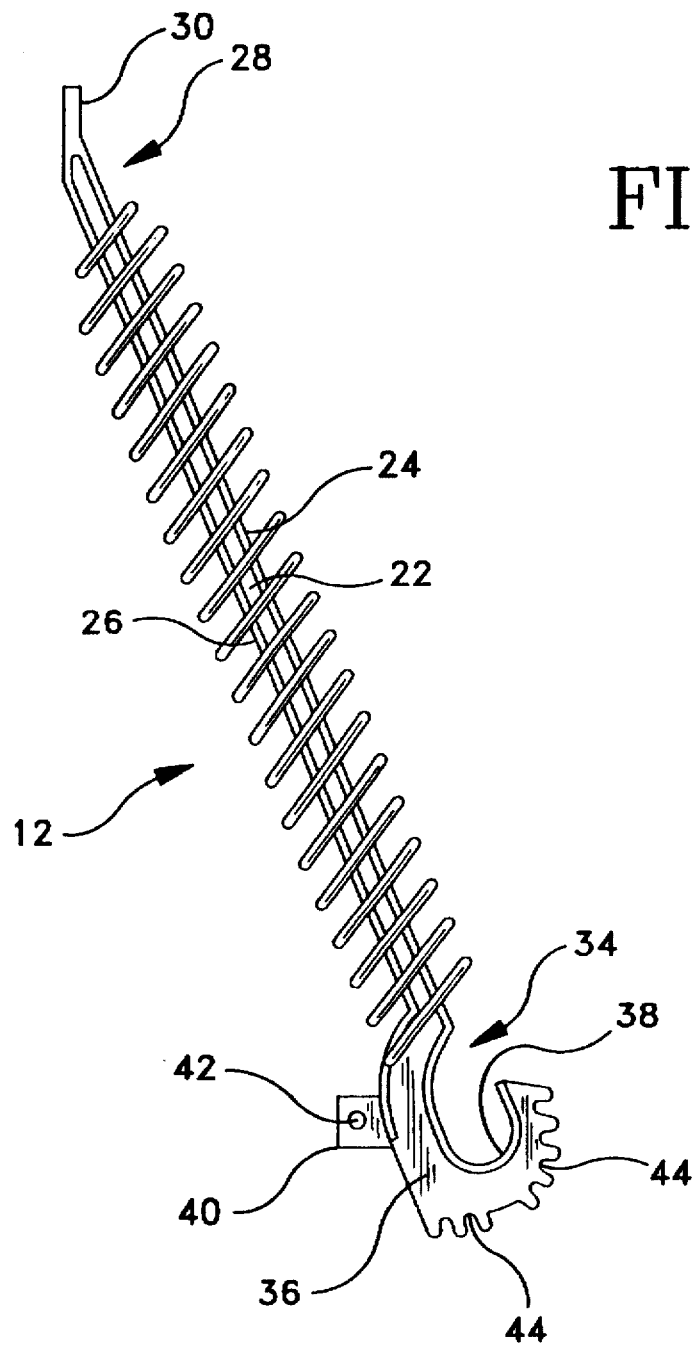
FIG. 2 is a front elevational view of an one arm member of the aerial cable spacer and support of FIG. 1.
Figure 4:
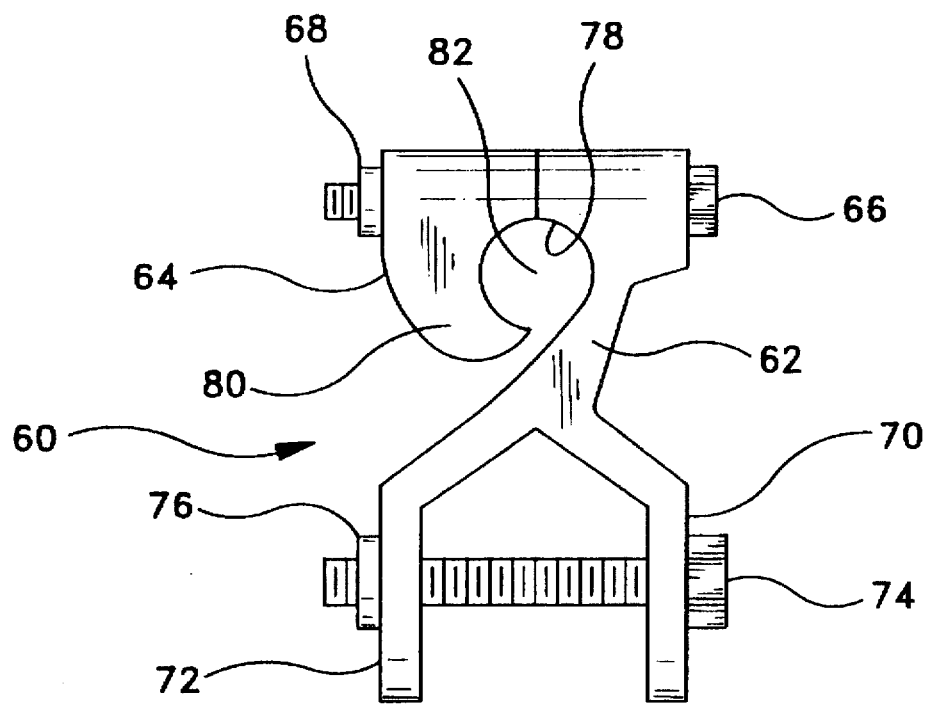
FIG. 4 is a front elevational view of the messenger hook of the aerial cable spacer and support of FIG. 1.
Figure 7:
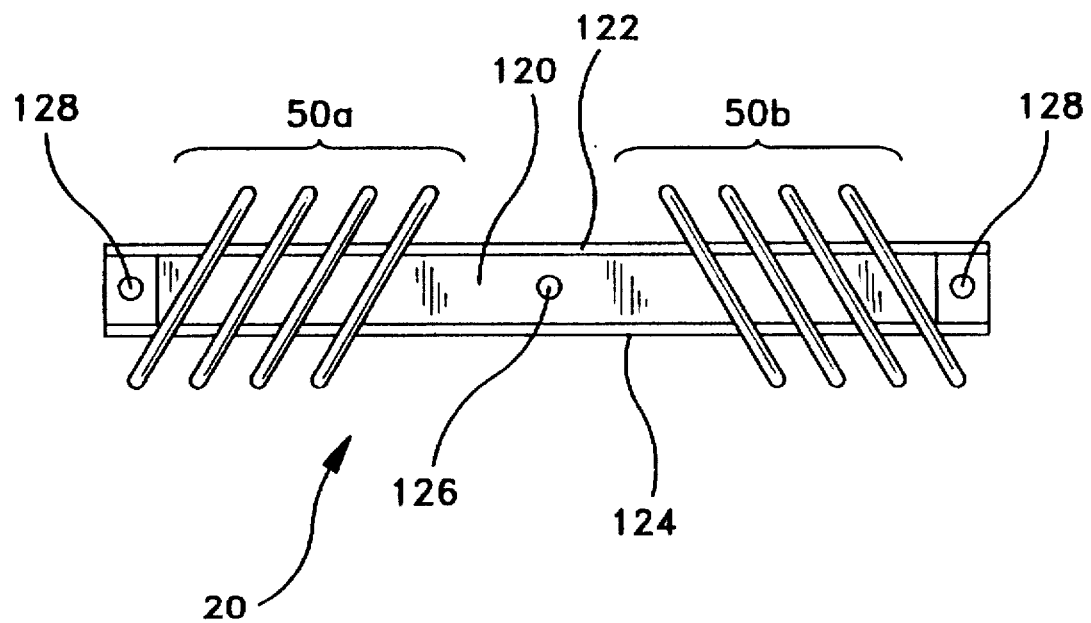
FIG. 7 is a front elevational view of a further brace of the aerial cable spacer and support of FIG. 1.

Arm 14 is the mirror image of arm 12 and is joined to it by the hook 60 as shown in FIGS. 1 and 4. Hook 60 has a main body portion 62 and a hook portion 64 which are united by a threaded fastener 66 passing through apertures in portions 62 and 64 (not shown) and a nut 68 threaded thereon. Body portion 62 terminates in two spaced apart legs 70 and 72 which also have apertures (not shown) extending through them to receive a threaded fastener 74 upon which a nut 76 is placed. Movement of nut 76 on threaded fastener 74 can control the spacing between the legs 70 and 72. The upper portion of body portion 62 contains a recess 78 while the in-turned end 80 of hook portion 64 when body portion 62 and hook portion 64 are joined from a substantially closed passageway 82 for a messenger cable (not shown). To mount the spacer 10 on a messenger cable the nut 68 is backed off of the fastener 66 sufficiently that a messenger cable can enter passageway 82 between end 80 and recess 78. Once in the passageway 82, the nut 68 is tightened to bring end 80 closer to recess 78 and prevent the messenger cable from exiting passageway 82.

The two arms 12 and 14 are positioned back to back with the tab of brace 18 between them so that tabs 30 and 30' and the tab of brace 18 can be inserted between legs 70 and 72 after the nut 76 and fastener 74 have been removed. The fastener 74 is then passed through the aperture (not shown) in leg 70, through the aperture 32 in tab 30 of arm 12, the aperture in the tab of brace 18, to be described below, the aperture 32' (not shown) of tab 30' through the aperture (not shown) in leg 72 and then the nut 76 is threadedly engaged with fastener 74 and tightened as required.

Brace 18 (see FIG. 6) has a flat central body portion 90 flanked by two transverse flanges 92 and 94 and is flattened at one end to a tab 96 having an aperture (not shown) therein which can be aligned with apertures 32 (an aperture similar to aperture 32 but in tab 30' and not shown) and 32' in tabs 30 and 30' when arms 12 and 14 are assembled with brace 18 as described above. A length of brace 18 near tab 96 are devoid of fins 50 and the first fin is the shorter fin 52 to prevent contact between the arms 12, 14 and brace 18 except in the region of the tabs 30, 30' and 96. At the opposite end of brace 18 is a flat tab 98 having a series of apertures 100 in it. Using appropriate fasteners apertures 100 can be used to join braces 18 and 20 with arm 16. As described above the fins 54 are partial fins completed when brace 20 is joined to arm 16.

Arm 16 is shown in FIG. 5. Flat central body 102 is flanked by transverse flanges 104 and 106. At one end is a hook 108 with a conductor saddle or seat 110. Flange 104 extends down to and about saddle 110. Flange 106 stops near the bottom of the saddle 110 and the remainder of this back edge contains tie slots 112. The opposite end of arm 16 is flattened into a tab 114 which contains a number of apertures 116 and partial fins 54.

Cross brace 20 has a flat central body 120 and two flanges 122, 124 transverse to body 120. An aperture 126 is in the center of body 120 and apertures 128 at each end. One series of fins 50a extend from the left of FIG. 7 towards the center and the series of fins 50b extend from the right towards the center.

To complete the assembly of spacer 10 once arms 12 and 14 and the top of brace 18 have been joined by hook 60, cross brace 20 is joined. One end of cross brace 20 is positioned over tab 40 so that apertures 42 and 128 are aligned and a fastener (not shown) is passed through these apertures. A nut (not shown) is fastened at the other end of the fastener. A second fastener is passed through the aligned holes 128 and 42' (not shown) of the second end of cross brace 20 and tab 40' (not shown) of arm 14 and a nut (not shown) is applied to the fastener. Tab 114 is placed over cross brace 20 so that aperture 116c is aligned with aperture 126. Brace 18 is placed below cross brace 20 so that aperture 100c is aligned with aperture 116c in arm 16 and aperture 126 of cross brace 20. A fastener (not shown) is then passed through apertures 116c, 126 and 100c and a nut (not shown) applied to complete the assembly. Additional fasteners can be passed through the remaining pairs of apertures 100 and 116.

The arms 12, 14 and 16 and the braces 18 and 20 are molded out of a thermoplastic material and the preferred form is a high-density polyethylene which has a low dielectric constant and has both weather and track resistant qualities. The tooling for molding the various components of the spacer may be made in modules which can be added or removed to change the length of each component part while maintaining the desired spacer arrangement for electrical purposes and for storm-proofing. For storm-proofing design requirements, the conductor should substantially underlie the messenger of the cable, which is compatible with strength requirements and pole height and tree clearance limitations and which is desirable in respect to the effect of phase-to-messenger spacing on line reactance, power factor and circuit voltage regulation. Also the arrangement of the spacer provides the desired equilateral triangular spacing of the conductor seats and to provide balanced or equal as possible leakage paths or surface distances between the individual phase conductors and ground.

The arrangement and proportions of the components shown in FIG. 1 can be used for cable systems with voltages up to 69 KV. Closer spacing of the conductor saddles and the messenger hook can be used for a lower voltage system. All that is necessary is to remove some some of the tool modules and make the components shorter.

While these have been shown and described and pointed out the fundamental novel features of the invention as applied to the preferred embodiment, it will be understood that various omissions and substitutions and changes of the form and details of the device illustrated and in its operating may be made by those skilled in the art, without departing from the spirit of the invention.

The embodiment of the invention in which an exclusive property or privilege is claimed are defined as follows:

1. A spacer for at least two aerial high voltage cables comprising:
   a. a first elongate arm member having a first open cable receiving hook at a first end, said first open hook for engaging a substantial portion of the periphery of a first high voltage cable to be placed in said first open hook and a first apertured tab at a second end;
   b. a plurality of first fins on said first arm member between said first end and said second end;
   c. a second elongate arm member having a second open cable receiving hook at a third end, said second open hook for engaging a substantial portion of the periphery of a second high voltage cable to be placed in said second open hook and a second apertured tab at a fourth end;
   d. a plurality of second fins on said second arm member between said third end and said fourth end;
   e. a cross brace member coupled at a first end to said first open cable receiving hook and at a second end to said second open cable receiving hook;
   f. a plurality of third fins on said cross brace member between said first end and said second ends of said cross brace member; and
   g. hook means coupled to said first apertured tab and said second apertured tab to permit said spacer to be hung from an overhead messenger cable.

2. A spacer as defined in claim 1, wherein said plurality of first fins extend at an acute angle to the longitudinal axis of said first arm member.

3. A spacer as defined in claim 1, wherein said plurality of second fins extend at an obtuse angle to the longitudinal axis of said second arm member.

4. A spacer as defined in claim 2, wherein said plurality of second fins extend at an obtuse angle to the longitudinal axis of said second arm member.

5. A spacer as defined in claim 1, wherein said plurality of third fins are divided into two groups, a first group situated between said cross brace member first end and the center of said cross brace member and extends at an acute angle to the longitudinal axis of said cross brace member and a second group situated between said cross brace member second end and the center of said cross brace member and extends at an obtuse angle to the longitudinal axis of said cross brace member.

6. A spacer as defined in claim 3, wherein said plurality of third fins are divided into two groups, a first group situated between said cross brace member first end and the center of said cross brace and extends at an acute angle to the longitudinal axis of said cross brace member and a second group situated between said cross brace member second end and the center of said cross brace member and extends at an obtuse angle to the longitudinal axis of said cross brace member.

7. A spacer as defined in claim 1, further comprising:
   a. an elongate brace member having a third apertured tab at its fifth end and a fourth apertured tab at its sixth end;
   b. a plurality of fourth fins on said elongate brace member between said fifth end and said sixth end of said elongate brace member;
   c. said hook means coupled to said first, second and fourth apertured tabs to permit said spacer to be hung from an overhead messenger cable; and
   d. coupling means for joining the third apertured tab of said elongate brace member to said cross brace member at its center.

8. A spacer as defined in claim 7, wherein said plurality of first fins extend at an acute angle to the longitudinal axis of said first arm member.

9. A spacer as defined in claim 7, wherein said plurality of second fins extend at an obtuse angle to the longitudinal axis of said second arm member.

10. A spacer as defined in claim 8, wherein said plurality of second fins extend at an obtuse angle to the longitudinal axis of said second arm member.

11. A spacer as defined in claim 7, wherein said plurality of third fins are divided into two groups, a first group situated between said cross brace member first end and the center of said cross brace member and extends at an acute angle to the longitudinal axis of said cross brace member and a second group situated between said cross brace member second end and the center of said cross brace member and extends at an obtuse angle to the longitudinal axis of said cross brace member.

12. A spacer as defined in claim 8, wherein said plurality of third fins are divided into two groups, a first group situated between said cross brace member first end and the center of said cross brace member and extends at an acute angle to the longitudinal axis of said cross brace member and a second group situated between said cross brace member second end and the center of said cross brace member and extends at an obtuse angle to the longitudinal axis of said cross brace member.

13. A spacer as defined in claim 7, wherein said plurality of fourth fins extend at an obtuse angle to the longitudinal axis of said elongate brace member.

14. A spacer as defined in claim 12, wherein said plurality of fourth fins extend at an obtuse angle to the longitudinal axis of said elongate brace member.

15. A spacer as defined in claim 7, further comprising:
   a. a third elongate arm member having a third cable receiving hook at a seventh end said third hook for engaging a substantial portion of the periphery of a third high voltage cable to be placed in said third hook and a fifth apertured tab at its eighth end;
   b. a plurality of fifth fins on said third arm member between said seventh end and said eighth end; and
   c. fastening means for fastening said fifth apertured tab of said third arm member to said third apertured tab of said elongate brace member and said cross brace member at the center thereof.

16. A spacer as defined in claim 14, wherein said plurality of fifth fins on said third arm member extend at an obtuse angle to the longitudinal axis of said third arm member.

* * * * *

UNITED STATES PATENT AND TRADEMARK OFFICE
CERTIFICATE OF CORRECTION

PATENT NO. : 5,700,980

DATED : December 23, 1997

INVENTOR(S) : Salvatore H. Bello, John W. Howanski

It is certified that error appears in the above-identified patent and that said Letters Patent is hereby corrected as shown below:

Title page, item [73]; "Conductron Corporation, Milford, N.H.", where in fact the assignee should be listed as "Hendrix Wire and Cable, Inc., Chicago, IL.".

Signed and Sealed this

Twentieth Day of October, 1998

Attest:

BRUCE LEHMAN

Attesting Officer

Commissioner of Patents and Trademarks